United States Patent
Chai et al.

(10) Patent No.: US 11,843,454 B2
(45) Date of Patent: Dec. 12, 2023

(54) DMRS PORT DETERMINING METHOD AND COMMUNICATIONS APPARATUS

(71) Applicant: Huawei Technologies Co., Ltd., Shenzhen (CN)

(72) Inventors: Xiaomeng Chai, Shanghai (CN); Yiqun Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/671,313

(22) Filed: Feb. 14, 2022

(65) Prior Publication Data

US 2022/0166584 A1 May 26, 2022

Related U.S. Application Data

(63) Continuation of application No. PCT/CN2020/108979, filed on Aug. 13, 2020.

(30) Foreign Application Priority Data

Aug. 14, 2019 (CN) .......................... 201910748987.8

(51) Int. Cl.
*H04L 5/00* (2006.01)
*H04L 1/1607* (2023.01)
*H04W 74/08* (2009.01)

(52) U.S. Cl.
CPC .......... *H04L 5/0051* (2013.01); *H04L 1/1614* (2013.01); *H04W 74/0841* (2013.01)

(58) Field of Classification Search
CPC ... H04L 5/0051; H04L 1/1614; H04L 5/0023; H04L 5/0053; H04L 5/0094;
(Continued)

(56) References Cited

U.S. PATENT DOCUMENTS

2020/0119879 A1  4/2020  Chen
2020/0235901 A1  7/2020  Dou et al.
(Continued)

FOREIGN PATENT DOCUMENTS

CN  103944847 A  7/2014
CN  108111283 A  6/2018
(Continued)

OTHER PUBLICATIONS

"Discussion on Channel Structure for Two-Step RACH," 3GPP TSG RAN WG1 #97, Reno, USA, R1-1906192, pp. 1-5, 3rd Generation Partnership Project, Valbonne, France (May 13-17, 2019).
(Continued)

*Primary Examiner* — Thai Nguyen
(74) *Attorney, Agent, or Firm* — Leydig, Voit & Mayer, Ltd.

(57) ABSTRACT

This application relates to the field of communications technologies, and discloses a DMRS port determining method and a communications apparatus, to resolve a problem that collisions occur on DMRS ports used by a large quantity of terminal devices to send uplink data and a random access effect is affected during 2-step random access. The method includes: receiving, by a terminal device, configuration information sent by a network device, where the configuration information includes DMRS configuration information and indication information of a DMRS port set, the DMRS configuration information is used to configure a plurality of DMRS ports, and the indication information of the DMRS port set is used to indicate one or more available DMRS ports in the plurality of DMRS ports; and determining, by the terminal device, a target DMRS port in the DMRS port set.

15 Claims, 10 Drawing Sheets

S601
A terminal device receives configuration information sent by a network device, where the configuration information includes DMRS configuration information and indication information of a DMRS port set S602
The terminal device determines a random access preamble S603
The terminal device determines a target DMRS port in the DMRS port set based on the random access preamble

(58) Field of Classification Search
CPC ............ H04L 5/0048; H04W 74/0841; H04W 74/008; H04W 74/0833; H04W 74/006; H04W 74/002; H04W 72/04

See application file for complete search history.

(56) References Cited

U.S. PATENT DOCUMENTS

| | | | |
|---|---|---|---|
| 2020/0344020 A1 | 10/2020 | Guo et al. | |
| 2021/0083724 A1 | 3/2021 | Su et al. | |
| 2022/0132595 A1* | 4/2022 | Ko | ................. H04L 5/0044 |

FOREIGN PATENT DOCUMENTS

| | | | | |
|---|---|---|---|---|
| CN | 108347324 A | 7/2018 | | |
| CN | 108632193 A | 10/2018 | | |
| CN | 108809609 A | 11/2018 | | |
| CN | 108882314 A | 11/2018 | | |
| CN | 109391359 A | 2/2019 | | |
| CN | 109391413 A | 2/2019 | | |
| CN | 109995497 A | 7/2019 | | |
| CN | 110034895 A | 7/2019 | | |
| CN | 110034904 A | 7/2019 | | |
| JP | 2021503847 A | 2/2021 | | |
| WO | 2019023876 A1 | 2/2019 | | |
| WO | 2019029662 A1 | 2/2019 | | |
| WO | 2019095931 A1 | 5/2019 | | |
| WO | 2019137162 A1 | 7/2019 | | |
| WO | WO-2021025610 A1 * | 2/2021 | ........... | H04L 5/0014 |
| WO | WO-2021026118 A1 * | 2/2021 | ........ | H04W 74/0833 |

OTHER PUBLICATIONS

"Summary of 7.2.1.1 Channel Structure for Two-step RACH," 3GPP TSG RAN WG1 #97, Reno, USA, R1-1907673, Total 62 pages, 3rd Generation Partnership Project, Valbonne, France (May 13-17, 2019).

"Channel Structure for Two-Step RACH," 3GPP TSG-RAN WG1 Meeting #97, Reno, USA, R1-1907752, pp. 1-10, 3rd Generation Partnership Project, Valbonne, France (May 13-17, 2019).

Huawei, HiSilicon, "Further discussion on channel structure for 2-step RACH," 3GPP TSG RAN WG1 Meeting #96bis, Xi'an, China, R1-1903923, total 6 pages, 3rd Generation Partnership Project, Valbonne, France (Apr. 8-12, 2019).

Nokia, Nokia Shanghai Bell, "On Enhancements to Initial Access Procedures for NR-U," 3GPP TSG RAN WG1 Meeting #96bis, Xi'an, China, R1-1904222, total 21 pages, 3rd Generation Partnership Project, Valbonne, France (Apr. 8-12, 2019).

"3rd Generation Partnership Project; Technical Specification Group Radio Access Network; NR; Physical layer procedures for control (Release 15)," 3GPP TS 38.213 V15.6.0, total 107 pages, 3rd Generation Partnership Project, Valbonne, France (Jun. 2019).

"3rd Generation Partnership Project; Technical Specification Group Radio Access Network; NR; Multiplexing and channel coding (Release 15)," 3GPP TS 38.212 V15.6.0, total 101 pages, 3rd Generation Partnership Project, Valbonne, France (Jun. 2019).

KDDI, "Discussion on channel structure for two-step RACH," 3GPP TSG RAN WG1 #97, Reno, U.S.A., R1-1907446, total 3 pages, 3rd Generation Partnership Project, Valbonne, France (May 13-17, 2019).

"3rd Generation Partnership Project; Technical Specification Group Radio Access Network; NR; Physical layer procedures for data (Release 15)," 3GPP TS 38.214 V15.6.0, total 105 pages, 3rd Generation Partnership Project, Valbonne, France (Jun. 2019).

"Evaluation for 2-step RACH," 3GPP TSG RAN WG1#97, Reno, USA, R1-1906126, Total 6 pages, 3rd Generation Partnership Project, Valbonne, France (May 13-17, 2019).

* cited by examiner ic # DMRS PORT DETERMINING METHOD AND COMMUNICATIONS APPARATUS

CROSS-REFERENCE TO RELATED APPLICATIONS

This application is a continuation of International Application No. PCT/CN2020/108979, filed on Aug. 13, 2020, which claims priority to Chinese Patent Application No. 201910748987.8, filed on Aug. 14, 2019. The disclosures of the aforementioned applications are hereby incorporated by reference in their entireties.

TECHNICAL FIELD

Embodiments of this application relate to the field of communications technologies, and in particular, to a demodulation reference signal (DMRS) port determining method and a communications apparatus.

BACKGROUND

A random access (RA) procedure of a terminal device may also be referred to as a random access channel (RACH) procedure. In systems such as long term evolution (LTE) and new radio (NR), the terminal device needs to enter a radio resource control (RRC) connected state from an RRC idle state or an inactive state through random access, to set up various bearers to a network device and further communicate with the network device. Currently, a 4-step random access (4-step physical random access channel, 4-step RACH) procedure is usually used for the random access procedure of the terminal device. The 4-step random access procedure includes: The terminal device sends a random access preamble to the network device, the network device sends a random access response to the terminal device, the terminal device sends uplink data to the network device, and the network device sends contention resolution information to the terminal device. To support random access in a low latency scenario, a 2-step random access (2-Step RACH) procedure is proposed. In the 2-step random access procedure, there are only two steps: The terminal device sends a random access preamble and uplink data to the network device, and the network device sends a random access response to the terminal device.

However, in the 4-step random access procedure, a random access response received by only a terminal device that has sent a random access preamble carries information about the sent random access preamble, and the terminal device sends uplink data based on a DMRS port indicated in the random access response. In the 2-step random access procedure, all terminal devices send random access preambles and uplink data to the network device by using a same configuration. Therefore, each terminal device may send uplink data on a same resource by using a same DMRS port. Consequently, collisions occur on DMRS ports used by a large quantity of terminal devices to send uplink data and a random access effect is affected.

SUMMARY

Embodiments of this application provide a DMRS port determining method and a communications apparatus, to resolve a problem that collisions occur on DMRS ports used by a large quantity of terminal devices to send uplink data and a random access effect is affected during 2-step random access.

It should be understood that a DMRS may alternatively be another reference signal used to demodulate data. In the embodiments of this application, the DMRS is used as an example for description. A random access preamble may alternatively be another sequence used for random access. In the embodiments of this application, the random access preamble is used as an example for description.

According to a first aspect, an embodiment of this application provides a DMRS port determining method, applied to a terminal device. The method includes: receiving configuration information sent by a network device, where the configuration information includes DMRS configuration information and indication information of a DMRS port set, the DMRS configuration information is used to configure a plurality of DMRS ports, and the indication information of the DMRS port set is used to indicate one or more available DMRS ports in the plurality of DMRS ports; and determining a target DMRS port in the DMRS port set. In this embodiment of this application, during random access, the network device may configure, for the terminal device, the DMRS port set that can be used for random access on a physical uplink shared channel (PUSCH) in a random access procedure, and the terminal device selects the target DMRS port from the DMRS port set that is configured by the network device and that can be used for random access, and uses the target DMRS port as a DMRS port corresponding to a random access preamble. This avoids that all terminal devices use a same DMRS port specified in a protocol and collisions occur on DMRS ports used by a large quantity of terminal devices to send uplink data, and further prevents a random access effect from being affected.

In a possible design, the determining a target DMRS port in the DMRS port set includes: determining a random access preamble; and determining the target DMRS port in the DMRS port set based on the random access preamble. In the foregoing design, the terminal device selects, from the DMRS port set based on the determined random access preamble, the target DMRS port corresponding to the determined random access preamble. This helps further avoid collisions occurs on DMRS ports used by a large quantity of terminal devices to send uplink data and further prevents a random access effect from being affected.

In a possible design, the indication information of the DMRS port set includes a bitmap, a parameter K, a parameter M and a parameter N, or an index number, where the bitmap is used to indicate distribution of DMRS ports that belong to the DMRS port set and that are in the plurality of DMRS ports; the parameter K is used to indicate that the first K DMRS ports of the plurality of DMRS ports in a preset DMRS port order belong to the DMRS port set; the parameter M and the parameter N are used to indicate that M DMRS ports, starting from an $N^{th}$ DMRS port, of the plurality of DMRS ports in the preset DMRS port order belong to the DMRS port set; and the index number is used to indicate one of a plurality of preset DMRS port sets corresponding to the plurality of DMRS ports. In the foregoing design, implementation of the indication information of the DMRS port set is enriched, so that indication information, including corresponding information, of a DMRS port set is selected based on a communications system and a communication condition, to indicate an available DMRS port in the DMRS port set.

In a possible design, the indication information of the DMRS port set is used to indicate that the first K DMRS ports of the plurality of DMRS ports in a preset DMRS port order belong to the DMRS port set.

In a possible design, the indication information of the DMRS port set is a quantity of DMRS ports, and the DMRS port set is a DMRS port set that is in a plurality of preset DMRS port sets corresponding to the plurality of DMRS ports and that matches the quantity of DMRS ports. In the foregoing design, implementation of the indication information of the DMRS port set is enriched, so that indication information, including corresponding information, of a DMRS port set is selected based on a communications system and a communication condition, to indicate an available DMRS port in the DMRS port set.

In a possible design, the indication information of the DMRS port set is an identifier of one or more DMRS code division multiplexing CDM groups, and the DMRS port set is a DMRS port set including a plurality of DMRS ports that correspond to the identifier of the one or more DMRS CDM groups and that are in the plurality of DMRS ports. In the foregoing design, an identifier of a CDM group is used to indicate a port set, so that signaling overheads can be reduced. In addition, implementation of the indication information of the DMRS port set is enriched, so that indication information, including corresponding information, of a DMRS port set is selected based on a communications system and a communication condition, to indicate an available DMRS port in the DMRS port set.

In a possible design, if the configuration information includes indication information of a plurality of DMRS port sets, frequency domain resources occupied by DMRS ports in different DMRS port sets do not overlap. In the foregoing design, orthogonality between the DMRS ports in the different DMRS port sets can be better ensured, and interference between the DMRS ports in the different DMRS port sets is reduced.

In a possible design, the determining the target DMRS port in the DMRS port set based on the random access preamble includes: determining, in the DMRS port set in a preset mapping order between a random access preamble and a DMRS port, the target DMRS port corresponding to the random access preamble. In the foregoing design, when the target DMRS port corresponding to the random access preamble is selected, a corresponding target DMRS port is selected based on an orthogonality requirement of target DMRS ports corresponding to different random access preambles, thereby improving random access stability.

According to a second aspect, an embodiment of this application provides a communications apparatus. The apparatus has a function of implementing the method in any one of the first aspect or the possible designs of the first aspect. The function may be implemented by hardware, or may be implemented by hardware executing corresponding software. The hardware or the software includes one or more modules corresponding to the function.

In a possible design, the apparatus may be a chip or an integrated circuit.

In a possible design, the apparatus includes a memory and a processor. The memory is configured to store a program executed by the processor. When the program is executed by the processor, the apparatus may perform the method in any one of the first aspect or the possible designs of the first aspect.

In a possible design, the apparatus may be a terminal device.

According to a third aspect, an embodiment of this application provides a computer-readable storage medium. The storage medium stores computer instructions. When the computer instructions are executed by a communications apparatus, the communications apparatus is enabled to perform the method in any one of the first aspect or the possible designs of the first aspect.

According to a fourth aspect, an embodiment of this application provides a computer program product including instructions. When the computer program product runs on a communications apparatus, the communications apparatus is enabled to perform the method in any one of the first aspect or the possible designs of the first aspect.

DESCRIPTION OF EMBODIMENTS

The following describes embodiments of this application in detail with reference to the accompanying drawings.

Figure 1:
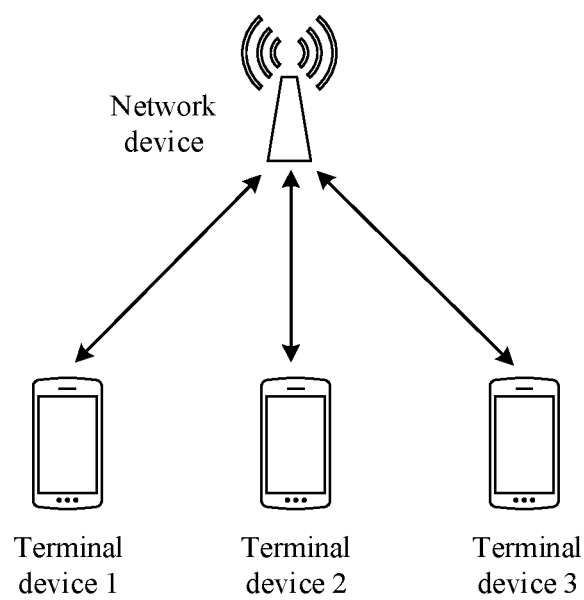
FIG. 1 is a schematic diagram of a communications architecture according to an embodiment of this application.

The technical solutions in the embodiments of this application may be applied to various communications systems such as a 5G system, a new radio (NR) system, an LTE system, and a long term evolution-advanced (LTE-A) system, and may further be extended to a wireless fidelity (Wi-Fi) system, a worldwide interoperability for microwave access (wimax) system, a cellular system related to 3GPP and the like, and a future communications system such as a 6G system. Specifically, an architecture of a communications system that the embodiments of this application use may be shown in FIG. 1, and includes a network device and a plurality of terminal devices. In FIG. 1, three terminal devices are used as an example. A terminal device 1 to a terminal device 3 may separately or simultaneously send data to the network device. It should be noted that a quantity of terminal devices and a quantity of network devices in the communications system shown in FIG. 1 are not limited in the embodiments of this application.

In addition, it should be understood that, the word "example" in the embodiments of this application is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

The terms "include/comprise" and "have" in the embodiments, claims, and accompanying drawings of this application are not exclusive. For example, a process, method, system, product, or device including a series of steps or modules is not limited to the enumerated steps or modules, and may further include a step or module that is not enumerated. The terms "system" and "network" may be interchangeably used in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification usually represents an "or" relationship between the associated objects. It should be understood that in the embodiments of this application, "B corresponding to A" indicates that B is associated with A, and B may be determined according to A. However, it should be further understood that determining B according to A does not mean that B is determined according to only A, that is, B may also be determined according to A and/or other information. In addition, unless otherwise stated, ordinal numbers such as "first" and "second" in the embodiments of this application are used to distinguish between a plurality of objects, but are not intended to limit an order, a time sequence, priorities, or importance of the plurality of objects. "A plurality of" in this application means two or more.

In addition, in the embodiments of this application, information, signal, message, or channel may be interchangeably used sometimes. It should be noted that meanings expressed by the terms are consistent when differences between the terms are not emphasized. "Of", "corresponding (relevant)", and "corresponding" may be interchangeably used sometimes. It should be noted that meanings expressed by the terms are consistent when differences between the terms are not emphasized.

Before the embodiments of this application are described, some terms in this application are first explained and described, to help a person skilled in the art have a better understanding.

(1) A terminal device includes a device that provides a user with voice and/or data connectivity, for example, may include a handheld device with a wireless connection function, or a processing device connected to a wireless modem. The terminal device may communicate with a radio access network (RAN), and exchange voice and/or data with the RAN. The terminal device may include user equipment (UE), a wireless terminal device, a mobile terminal device, a device-to-device communication (D2D) terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (which is also referred to as a "cellular" phone), a computer with a mobile terminal device, or a portable, pocket-sized, handheld, or computer built-in mobile apparatus. For example, the terminal device may include a device such as a personal communications service (PCS) phone, a cordless phone, a session initiation protocol (SIP) phone, a wireless local loop (WLL) station, or a personal digital assistant (PDA). The terminal device further includes a limited device, for example, a device with relatively low power consumption, a device with a limited storage capability, or a device with a limited computing capability. For example, the terminal device may include an information sensing device, for example, a barcode, radio frequency identification (RFID), a sensor, a global positioning system (GPS), or a laser scanner.

As an example instead of a limitation, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligently design daily wear, such as glasses, gloves, watches, clothes, and shoes. The wearable device is a portable device that is directly worn on a body or integrated into clothes or an accessory of a user. The wearable device is not only a hardware device, but is used to implement powerful functions through software support, data exchange, and cloud interaction. In a broad sense, the wearable intelligent device includes full-featured and large-sized devices that can implement all or some functions without depending on smartphones, for example, smartwatches or smart glasses, and devices that focus on only one type of application function and need to work with other devices such as smartphones, for example, various smart bands, smart helmets, or smart jewelry for monitoring physical signs.

However, if the various terminal devices described above are located on a vehicle (for example, placed in the vehicle or installed in the vehicle), the terminal devices may be considered as vehicle-mounted terminal devices. For example, the vehicle-mounted terminal devices are also referred to as on-board units (OBU).

In the embodiments of this application, the terminal device may further include a relay. Alternatively, it may be understood that any device that can perform data communication with a base station may be considered as a terminal device.

(2) A network device may be a device that is in an access network and that communicates with a wireless terminal device over an air interface through one or more cells. The network device may be a node in a radio access network, and may also be referred to as a base station or a radio access network (RAN) node (or device). Currently, for example, some network devices are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a base band unit (BBU), and a wireless fidelity (Wi-Fi) access point (AP). In addition, in a network structure, the network device may include a central unit (CU) node and a distributed unit (DU) node. In this structure, protocol layers of an eNB in a long term evolution (LTE) system are split, where functions of some protocol layers are centrally controlled by a CU, functions of some or all of remaining protocol layers are distributed in a DU, and the CU centrally controls the DU.

Figure 2A:
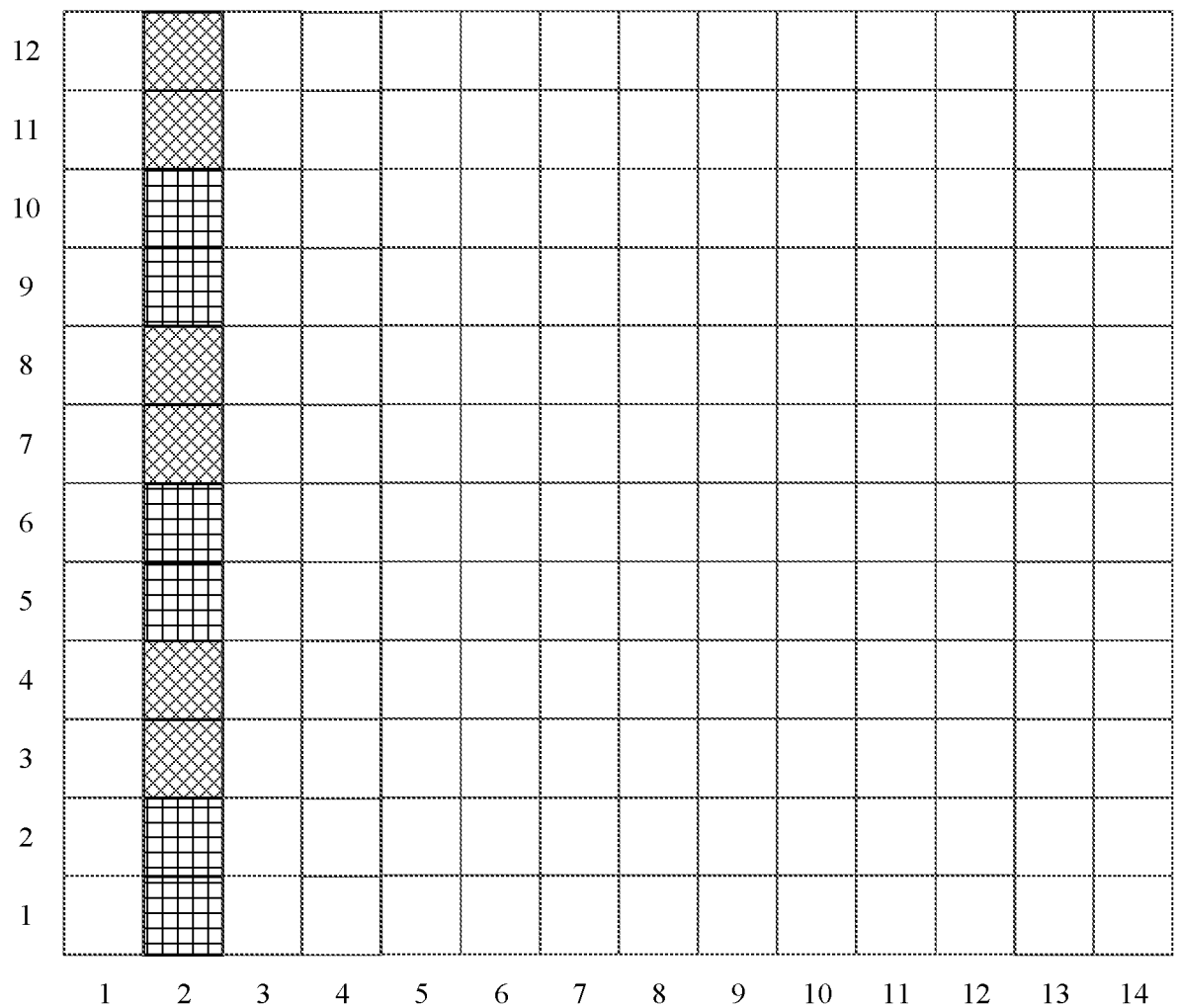
FIG. 2A is a schematic diagram of a DMRS resource of a DMRS pilot type 1 and with a single front-load symbol according to an embodiment of this application.
Figure 2B:
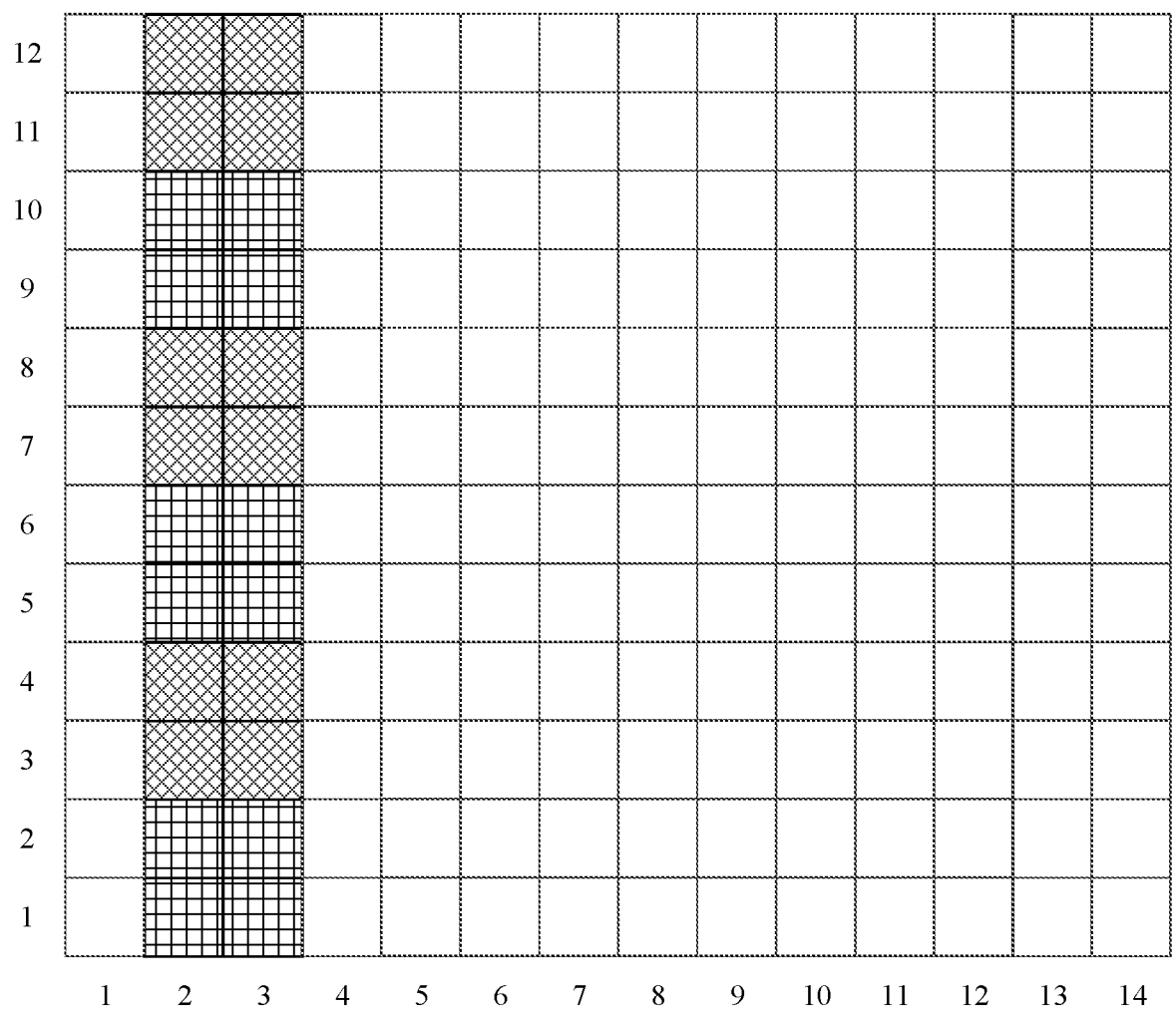
FIG. 2B is a schematic diagram of a DMRS resource of a DMRS pilot type 1 and with double front-load symbols according to an embodiment of this application.

(3) A DMRS port is a logical antenna port distinguished by using a demodulation reference signal. The DMRS port is multiplexed in a frequency division multiplexing (FDM)+ code division multiplexing (CDM) manner, and each DMRS CDM group includes a plurality of DMRS ports through orthogonal cover code (OCC) multiplexing. An NR system supports two DMRS types (a DMRS type 1 and a DMRS type 2). DMRSs are classified into a single front-load (Front-loaded)—symbol DMRS and a double front-load symbol—DMRS. The DMRS type 1 and the single front-load symbol support a maximum of four DMRS ports. The DMRS type 1 and the double front-load symbols support a maximum of eight DMRS ports. The DMRS type 2 and the single front-load symbol support a maximum of six DMRS ports. The DMRS type 2 and the double front-load symbols support a maximum of 12 DMRS ports. Multiplexing and configuration manners of the two types of DMRSs are specifically described as follows:

For a reference signal of the DMRS type 1, DMRS ports are classified into two DMRS CDM groups. For example, referring to FIG. 2A, for a (single) front-load symbol (corresponding to an orthogonal frequency division multiplexing (OFDM) symbol numbered 2, represented on a horizontal axis in the figure)—DMRS, subcarriers (represented on a vertical axis in the figure) of the OFDM symbol are classified into two groups. To be specific, the subcarriers of the OFDM symbol are classified into two DMRS CDM groups, and each DMRS CDM group corresponds to two DMRS ports that are multiplexed in the single OFDM symbol in an OCC manner. Referring to FIG. 2A, a DMRS CDM group 0 corresponds to DMRS resource elements (REs) of an antenna port 0/1, and a DMRS CDM group 1 corresponds to DMRS REs of an antenna port 2/3. To be specific, the DMRS CDM group 0 corresponds to the DMRS port 0 and the DMRS port 1, and the DMRS CDM group 1 corresponds to the DMRS port 2 and the DMRS port 3. As shown in FIG. 2B, for a two (double) front-load symbol (corresponding to OFDM symbols numbered 2 and 3)—DMRS, subcarriers of the OFDM symbols are classified into two groups. To be specific, the subcarriers of the OFDM symbols are classified into two DMRS CDM groups, and each DMRS CDM group corresponds to four DMRS ports that are multiplexed in the double OFDM symbols in an OCC manner. Referring to FIG. 2B, a DMRS CDM group 0 corresponds to DMRS REs of an antenna port 0/1/4/5, and a DMRS CDM group 1 corresponds to DMRS REs of an antenna port 2/3/6/7. To be specific, the DMRS CDM group 0 corresponds to the DMRS port 0, the DMRS port 1, the DMRS port 4, and the DMRS port 5, and the DMRS CDM group 1 corresponds to the DMRS port 2, the DMRS port 3, the DMRS port 6, and the DMRS port 7.

Figure 3A:
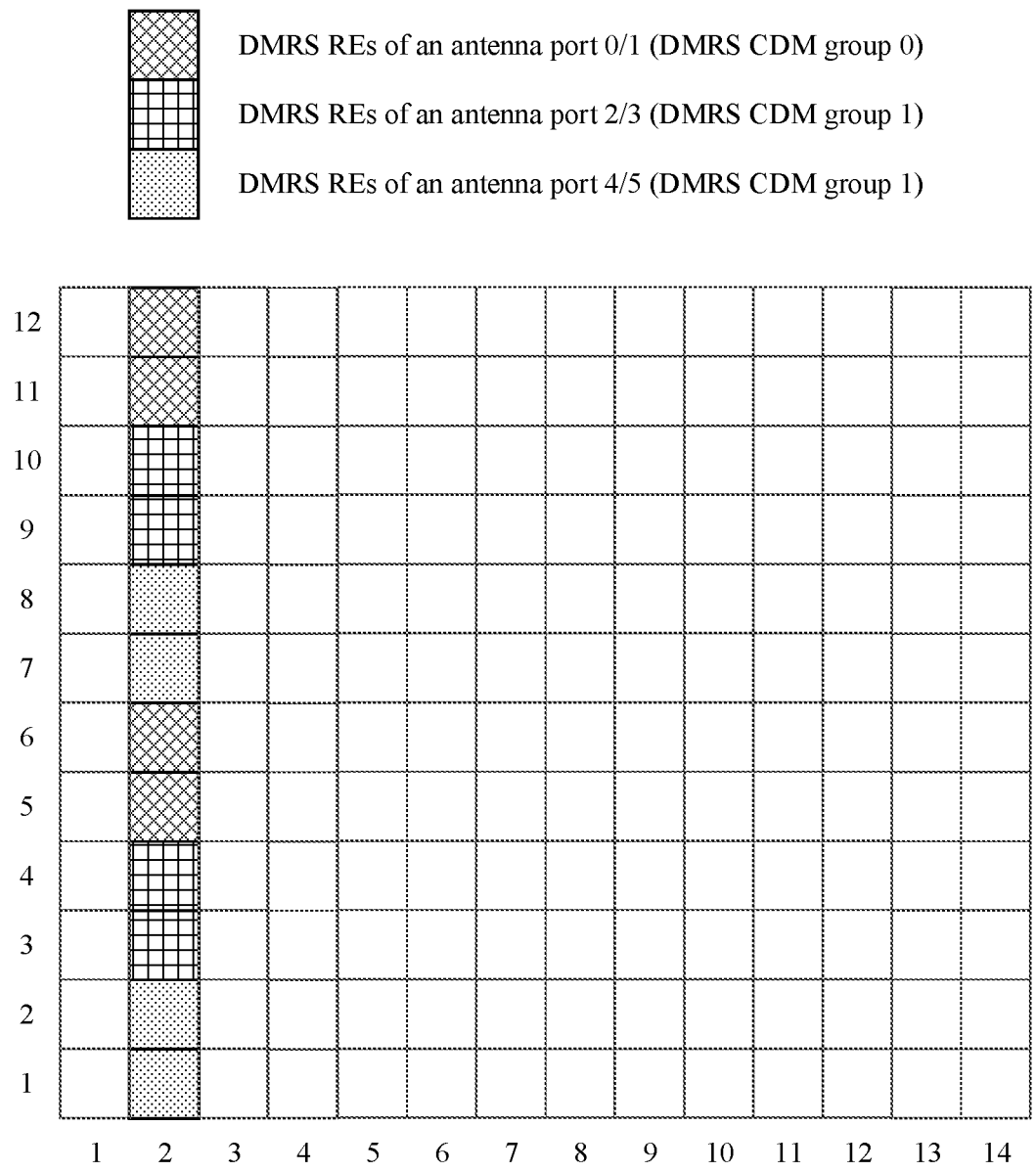
FIG. 3A is a schematic diagram of a DMRS resource of a DMRS pilot type 2 and with a single front-load symbol according to an embodiment of this application.
Figure 3B:
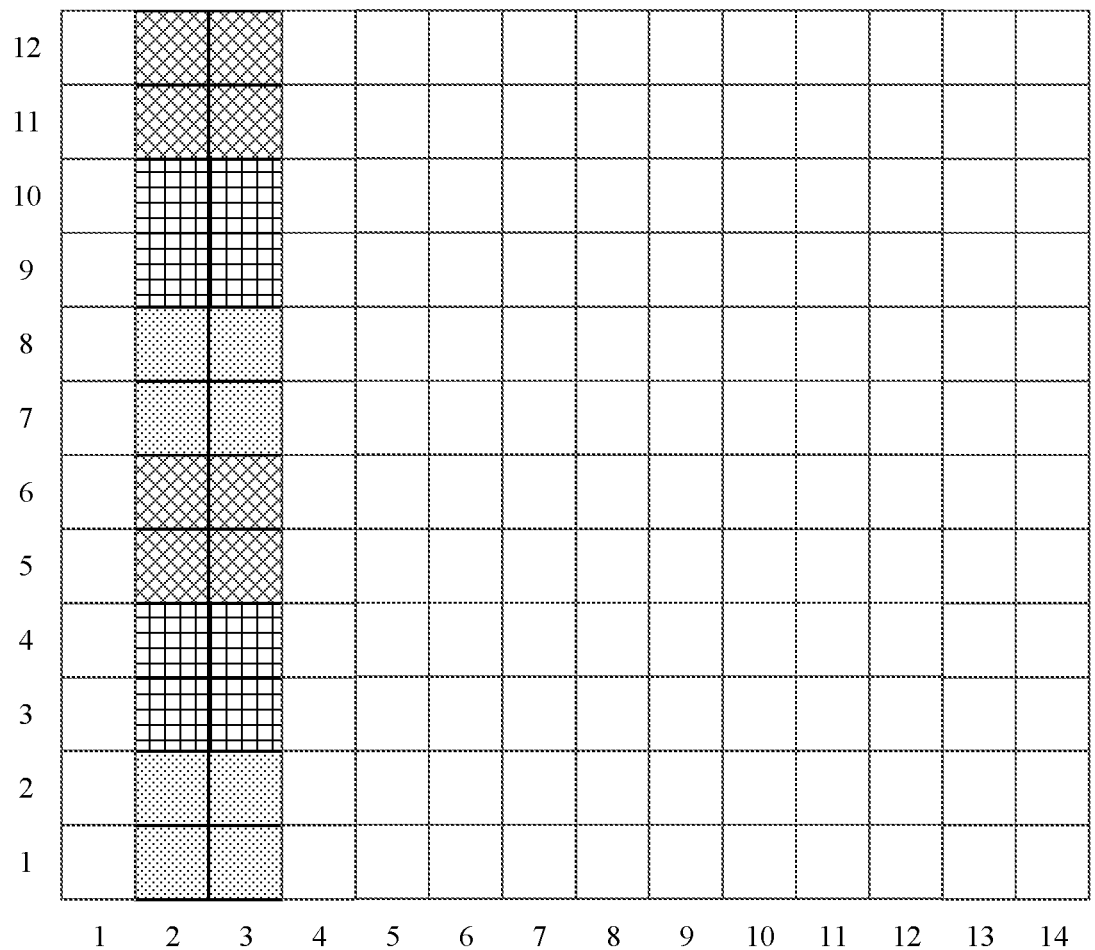
FIG. 3B is a schematic diagram of a DMRS resource of a DMRS pilot type 2 and with double front-load symbols according to an embodiment of this application.

For the DMRS type 2, DMRS ports are classified into three DMRS CDM groups. For example, as shown in FIG. 3A, for a (single) front-load symbol (corresponding to OFDM numbered 2)—DMRS, subcarriers of the OFDM symbol are classified into three groups. To be specific, the subcarriers of the OFDM symbol are classified into three DMRS CDM groups, and each DMRS CDM group corresponds to two DMRS ports that are multiplexed in the single OFDM symbol in an OCC manner. Referring to FIG. 3A, a DMRS CDM group 0 corresponds to DMRS REs of an antenna port 0/1, a DMRS CDM group 1 corresponds to DMRS REs of an antenna port 2/3, and a DMRS CDM group 2 corresponds to DMRS REs of an antenna port 4/5. To be specific, the DMRS CDM group 0 corresponds to the DMRS port 0 and the DMRS port 1, the DMRS CDM group 1 corresponds to the DMRS port 2 and the DMRS port 3, and the DMRS CDM group 2 corresponds to the DMRS port 4 and the DMRS port 5. Referring to FIG. 3B, for two (double) front-load symbol (corresponding to OFDM symbols numbered 2 and 3)—DMRS, subcarriers of the OFDM symbols are classified into three groups. To be specific, the subcarriers of the OFDM symbols are classified into three DMRS CDM groups, and each DMRS CDM group corresponds to four OFDM ports that are multiplexed in the double OFDM symbols in an OCC manner. Referring to FIG. 3B, a DMRS CDM group 0 corresponds to DMRS REs of an antenna port 0/1/6/7, a DMRS CDM group 1 corresponds to DMRS REs of an antenna port 2/3/8/9, and a DMRS CDM group 2 corresponds to DMRS REs of an antenna port 4/5/10/11. To be specific, the DMRS CDM group 0 corresponds to the DMRS port 0, the DMRS port 1, the DMRS port 6, and the DMRS port 7, the DMRS CDM group 1 corresponds to the DMRS port 2, the DMRS port 3, the DMRS port 8, and the DMRS port 9, and the DMRS CDM group 2 corresponds to the DMRS port 4, the DMRS port 5, the DMRS port 10, and the DMRS port 11. It should be noted that the foregoing classification of the DMRS ports is merely used to help understand the solutions of this application, and does not impose any limitation on the solutions of this application. In other words, there may be another classification solution.

In addition, if transform precoding is enabled, that is, when a discrete Fourier transform spread orthogonal frequency division multiplexing (DFT-s-OFDM) waveform is used, only the DMRS type 1 may be used. If transform precoding (transform precoding) is not enabled, that is, when a cyclic prefix orthogonal frequency division multiplexing (CP-OFDM) waveform is used, the DMRS type 1 or the DMRS type 2 may be used.

(4) DMRS configuration, where a DMRS resource mapping formula in a CP-OFDM waveform is as follows:

$$\tilde{a}_{k,l}^{(\tilde{p}_j,\mu)} = w_f(k')w_t(l')r(2n+k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

$$j = 0, 1, \ldots, v - 1$$

A DMRS resource mapping formula in a DFT-s-OFDM waveform is as follows:

$$\tilde{a}_{k,l}^{(\tilde{p}_0,\mu)} = w_f(k')w_t(l')r(2n+k')$$

$$k = 4n + 2k' + \Delta$$

$$k' = 0, 1$$

$$l = \bar{l} + l'$$

$$n = 0, 1, \ldots$$

Configuration type 1 represents the DMRS type 1. Configuration type 2 represents the DMRS type 2. k is a frequency domain position. l is a time domain position. $\Delta$ is a frequency domain offset. $w_f(k')$ and $w_t(l')$ respectively represent orthogonal cover codes (orthogonal cover code, OCC) in frequency domain and time domain. $\tilde{a}_{k,l}^{(\tilde{p}_j,\mu)}$ represents an intermediate quantity obtained before precoding and physical resource mapping operations are performed. j represents a PUSCH layer index. $\upsilon$ represents a total quantity of PUSCH layers. r(2n+k') represents a DMRS sequence. For values of k' and l', refer to Table 6.4.1.1.3-1 and Table 6.4.1.1.3-2.

According to Table 6.4.1.1.3-1 (corresponding to the DMRS type 1) and Table 6.4.1.1.3-2 (corresponding to the DMRS type 2), a parameter for each DMRS port in the DMRS type 1 or the DMRS type 2 may be determined, and then a resource of the DMRS port is determined according to the foregoing DMRS resource mapping formula.

TABLE 6.4.1.1.3-1

Parameters for a PUSCH DM-RS configuration type 1
(Parameters for a PUSCH DMRS type 1)

| $\tilde{p}$ (Antenna port) | CDM group (DMRS CDM group) | $\Delta$ | $w_f(k')$ $k'=0$ | $w_f(k')$ $k'=1$ | $w_t(l')$ $l'=0$ | $w_t(l')$ $l'=1$ |
|---|---|---|---|---|---|---|
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

TABLE 6.4.1.1.3-2

Parameters for a PUSCH DM-RS configuration type 2
(Parameters for a PUSCH DMRS type 2)

| $\tilde{p}$ | CDM group | $\Delta$ | $w_f(k')$ $k'=0$ | $w_f(k')$ $k'=1$ | $w_t(l')$ $l'=0$ | $w_t(l')$ $l'=1$ |
|---|---|---|---|---|---|---|
| 0 | 0 | 0 | +1 | +1 | +1 | +1 |
| 1 | 0 | 0 | +1 | −1 | +1 | +1 |
| 2 | 1 | 2 | +1 | +1 | +1 | +1 |
| 3 | 1 | 2 | +1 | −1 | +1 | +1 |
| 4 | 2 | 4 | +1 | +1 | +1 | +1 |
| 5 | 2 | 4 | +1 | −1 | +1 | +1 |
| 6 | 0 | 0 | +1 | +1 | +1 | −1 |
| 7 | 0 | 0 | +1 | −1 | +1 | −1 |
| 8 | 1 | 2 | +1 | +1 | +1 | −1 |
| 9 | 1 | 2 | +1 | −1 | +1 | −1 |
| 10 | 2 | 4 | +1 | +1 | +1 | −1 |
| 11 | 2 | 4 | +1 | −1 | +1 | −1 |

In addition, in an existing NR system, regardless of dynamic scheduling or unlicensed transmission, a network device explicitly indicates, to a user, one or more DMRS ports used for PUSCH transmission. A specific indication method is to indicate antenna port indication information, a waveform, a DMRS type, a maximum DMRS time domain length, and a quantity of ranks by using an RRC message or DCI. Each of the foregoing configurations except the antenna port indication information corresponds to a DMRS port indication table in the 3GPP protocol: TS 38.212. The DMRS port indication table is, for example, a DMRS port indication table shown in Table 7.3.1.1.2-15, when the DMRS type is a DMRS type 1, a maximum DMRS time domain length is two front-load symbols, and a quantity of ranks is 4 in a CP-OFDM waveform. The antenna port indication information is used to indicate a specific entry in a determined DMRS port indication table. For example, when the antenna port indication information is 0, it indicates that the user cannot map data to two DMRS CDM groups, and an actual front-load DMRS time domain length is one symbol. After actual random access, DMRS ports 0 to 3 are used for PUSCH transmission. Table 7.3.1.1.2-15 is shown as follows:

TABLE 7.3.1.1.2-15

Antenna port(s), transform precoder is disabled, dmrs-Type = 1, maxLength = 2, rank = 4 (antenna port, transform precoding is disabled (CP-OFDM waveform), DMRS type = 1, maximum DMRS time domain length = 2, and quantity of ranks = 4)

| Value (value) | Number of DMRS CDM group(s) without data (quantity of DMRS CDM groups without data) | DMRS port(s) (DMRS port) | Number of front-load symbols (quantity of front-load symbols) |
|---|---|---|---|
| 0 | 2 | 0 to 3 | 1 |
| 1 | 2 | 0, 1, 4, and 5 | 2 |
| 2 | 2 | 2, 3, 6, and 7 | 2 |
| 3 | 2 | 0, 2, 4, and 6 | 2 |
| 4 to 15 | Reserved (reserved) | Reserved (reserved) | Reserved (reserved) |

Figure 4:
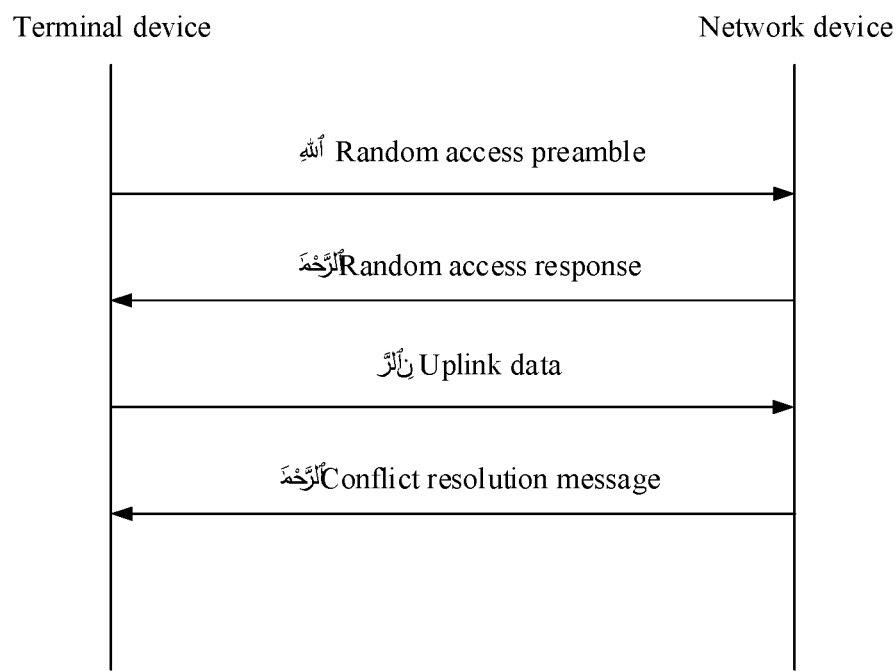
FIG. 4 is a schematic diagram 1 of a random access procedure according to an embodiment of this application.

(5) Random access (RA) procedure: Random access procedures are classified into a 4-step random access procedure and a 2-step random access procedure. Referring to FIG. 4, the 2-step random access procedure includes the following steps. Step 1: A terminal device sends a random access preamble to a network device. Step 2: After receiving the random access preamble, the network device sends a random access response (RAR) to the terminal device, where the random access response may include parameters such as the random access preamble, an uplink data timing advance, configuration information of an uplink resource used to send uplink data, and a temporary cell radio network temporary identifier (C-RNTI). Step 3: The terminal device receives the random access response. If a random access preamble indicated by a sequence number of the random access preamble in the random access response is the same as the random access preamble sent by the terminal device to the network device in step 1, the terminal device determines that the random access response is for the terminal device, and the terminal device sends the uplink data to the network device based on an indication of the random access response, for example, sends the uplink data on a PUSCH DMRS port specified in a protocol. Step 4: The network device receives the uplink data sent by the terminal device, and sends a contention resolution message to the terminal device. The network device includes a unique identifier in the contention resolution message to specify a terminal device that successfully performs access, and another terminal device that fails to perform access initiates random access again.

Figure 5:
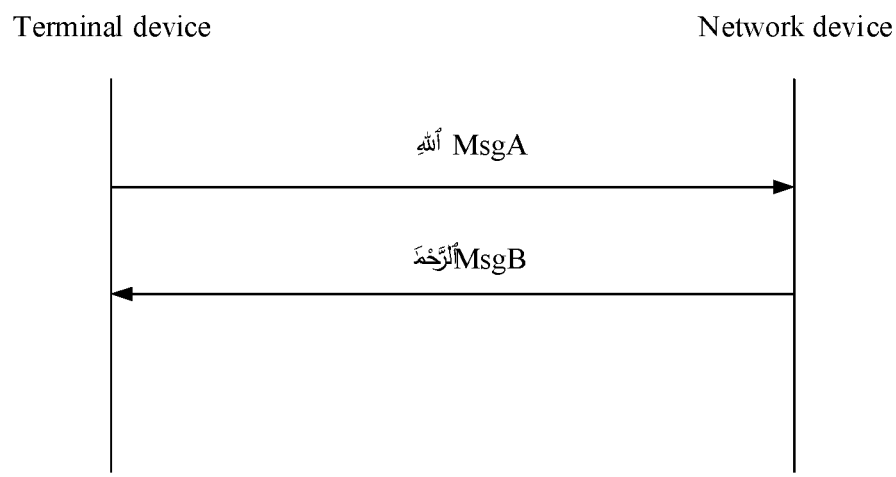
FIG. 5 is a schematic diagram 2 of a random access procedure according to an embodiment of this application.

Referring to FIG. 5, the 2-step random access procedure includes the following steps. Step 1: A terminal device sends a message A (MsgA) to a network device, where the MsgA includes a random access preamble and uplink data. Step 2: After receiving the MsgA sent by the terminal device, the network device sends a MsgB to the terminal device, where the MsgB may be used to send a random access response and contention resolution.

When a terminal device in an idle state or an inactive state enters an RRC connected state through the 4-step random access procedure, the terminal device needs to complete at least four times of signaling exchange to communicate with the network device. For an ultra-reliable and low-latency communication (URLLC) service, four times of signaling exchange cause a relatively high latency, and a URLLC low-latency requirement cannot be met. For a massive machine-type communications (mMTC) service, because most services are sporadic small packets, the terminal device can sends data only after performing a complete 4-step random access procedure each time to enter the RRC connected state, and then return to the idle state or the inactive state again. Consequently, a latency is relatively high, and signaling overheads are also high. However, a quantity of times of signaling exchange required in the 2-step random access procedure is reduced, thereby reducing signaling overheads and a latency. The 2-step random access procedure is applicable to an application scenario that has a low-latency requirement.

However, for the 2-step random access procedure, if terminal devices do what the terminal devices do in the 4-step random access procedure, that is, all terminal devices send random access preambles and uplink data to the network device by using a same configuration, and each terminal device may send uplink data on a same resource by using a same DMRS port, collisions occur on DMRS ports used by a large quantity of terminal devices to send uplink data and a random access effect is affected. This application is intended to resolve the problem that the collisions occur on the DMRS ports used by the large quantity of terminal devices to send the uplink data and the random access effect is affected during 2-step random access.

The following describes the embodiments of this application in detail with reference to the accompanying drawings.

Embodiment 1

Figure 6:
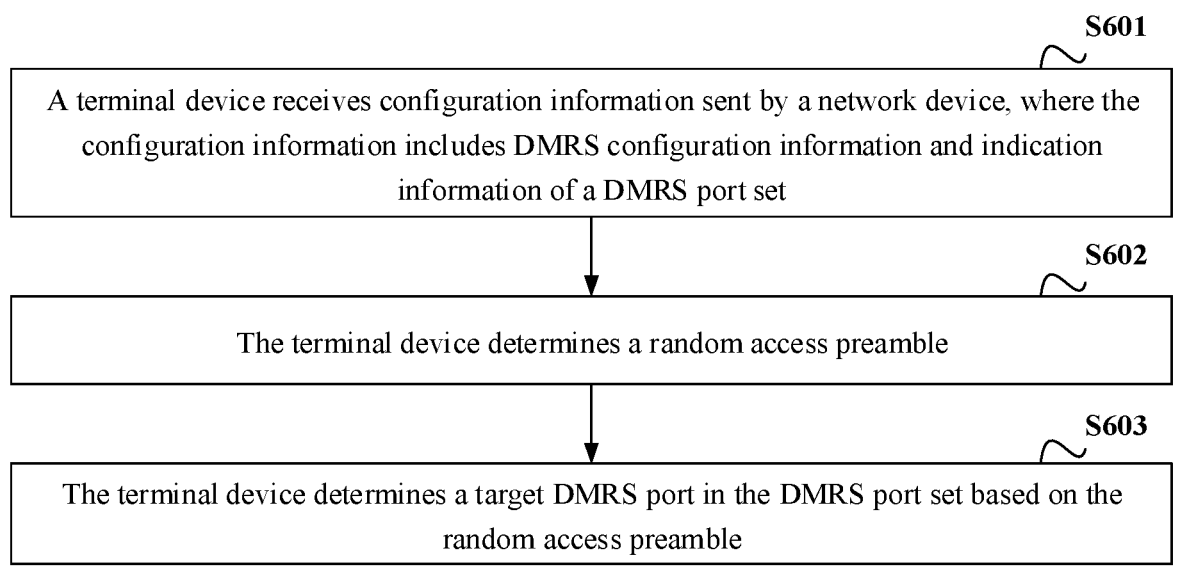
FIG. 6 is a schematic diagram 1 of a DMRS port determining process according to an embodiment of this application.

FIG. 6 is a schematic diagram of a DMRS port determining process according to an embodiment of this application. The process includes the foregoing steps.

S601: A terminal device receives configuration information sent by a network device, where the configuration information includes DMRS configuration information and indication information of a DMRS port set.

In this embodiment of this application, the DMRS configuration information sent by the network device is used to determine (a plurality of) DMRS ports that are configured by the network device for the terminal device and that may be selected into the DMRS port set, and a resource of each DMRS port that may be selected into the DMRS port set. For ease of description, "DMRS ports that may be selected into the DMRS port set" are referred to as "candidate DMRS ports" below. The candidate DMRS ports configured in the DMRS configuration information are all DMRS ports that are predefined in a protocol and that are configured by using the DMRS configuration information. The indication information of the DMRS port set is used to determine one or more available DMRS ports (which are DMRS ports that can be used to be associated with a random access preamble) in the candidate DMRS ports configured by the network device for the terminal device, to constitute the DMRS port set.

For example, the DMRS configuration information may include DMRS type configuration information and DMRS time domain length configuration information. Certainly, the DMRS configuration information may further include one or more of the following information such as DMRS sequence configuration information, DMRS additional location configuration information, and configuration information of a DMRS CDM group without data. Specifically, the DMRS type configuration information is used to indicate a DMRS type, for example, a DMRS type 1 and a DMRS type 2. The DMRS time domain length configuration information is used to indicate a DMRS time domain length, for example, a single front-load symbol (where a front-load symbol is a specific OFDM symbol, and details are not described again subsequently) or double front-load symbols. The DMRS sequence configuration information is used to indicate information required for generating a DMRS sequence. The DMRS additional location configuration information is used to indicate an OFDM symbol that is additionally occupied in addition to the front-load symbol, for example, to indicate that a DMRS further occupies an OFDM symbol numbered 11 in addition to the front-load symbol. The configuration information of the DMRS CDM group without data is used to indicate specific DMRS CDM groups corresponding to Res to which data cannot be mapped.

A plurality of pieces of information in the information such as the indication information of the DMRS port set, the DMRS type configuration information, the DMRS time domain length configuration information, the DMRS sequence configuration information, the DMRS additional location configuration information, and the configuration information of the DMRS CDM group without data may be jointly encoded, that is, the plurality of pieces of information in the foregoing information are indicated by using one parameter.

The terminal device may determine, based on the DMRS configuration information, for example, the DMRS type configuration information and the DMRS time domain length configuration information, each candidate DMRS port and a resource (where the resource is a time domain resource and/or a frequency domain resource and/or a code domain resource) of the candidate DMRS port that are configured by the network device for the terminal device. Referring to FIG. 2A, if the DMRS configuration information is that the DMRS type is the DMRS type 1 and the DMRS time domain length is the single front-load symbol, the terminal device may determine that the candidate DMRS ports configured by the network device for the terminal device are a DMRS port 0, a DMRS port 1, a DMRS port 2, and a DMRS port 3 that satisfy a configuration that the DMRS type is the DMRS type 1 and the DMRS time domain lengths are the single front-load symbol.

In an example, the network device may send the configuration information to the terminal device by using a broadcast or multicast message, an RRC message, a downlink control information (downlink control information, DCI) message, or the like.

After determining, based on the DMRS configuration information sent by the network device, the candidate DMRS ports configured by the network device for the terminal device, the terminal device may determine, based on the indication information of the DMRS port set in the candidate DMRS ports configured by the network device for the terminal device, the one or more available DMRS ports that belong to the DMRS port set.

In this embodiment of this application, the indication information of the DMRS port set may include one of a bitmap, a parameter K, a parameter M and a parameter N, and an index number, or may be a quantity of DMRS ports, an identifier of one or more DMRS CDM groups, or the like, provided that the one or more available DMRS ports that belong to the DMRS port set can be indicated in the candidate DMRS ports configured by the network device for the terminal device. The following provides descriptions with reference to a specific implementation.

Manner 1: The indication information of the DMRS port set includes one of the bitmap, the parameter K, the parameter M and the parameter N, and the index number.

(1) The indication information of the DMRS port set includes the bitmap (bitmap), and the bitmap is used to indicate distribution of DMRS ports that belong to the DMRS port set and that are in the candidate DMRS ports configured by the network device for the terminal device.

In a possible implementation, a length (a quantity of bits) of the bitmap may be the same as a quantity of candidate DMRS ports configured by the network device for the terminal device. The first bit (bit) of the bitmap indicates whether a DMRS port numbered 0 in the candidate DMRS ports configured by the network device for the terminal device is available. By analogy, the second bit of the bitmap indicates whether a DMRS port numbered 1 in the candidate DMRS ports configured by the network device for the terminal device is available, and so on. Specifically, 1 may be used to indicate that a DMRS port is available, and 0 may be used to indicate that a DMRS port is unavailable. Referring to FIG. 2A, for example, the DMRS configuration information is that the DMRS type is the DMRS type 1 and the DMRS time domain length is the single front-load symbol. To be specific, the candidate DMRS ports configured by the network device for the terminal device are the DMRS port 0, the DMRS port 1, the DMRS port 2, and the DMRS port 3, and the bitmap included in the indication information of the DMRS port set is "1010". In this case, the terminal device determines that the DMRS port 0 and the DMRS port 2 are available DMRS ports, and the DMRS port set is {DMRS port 0, DMRS port 2}.

In another possible implementation, a length of the bitmap may be the same as a maximum quantity of candidate DMRS ports configured by the network device for the terminal device. Referring to FIG. 3B, when the DMRS type is the DMRS type 2 and the DMRS time domain length is the double front-load symbols, a quantity of candidate DMRS ports configured by the network device for the terminal device is maximum, a quantity of DMRS ports is 12, and the length of the bitmap may be set to 12 bits. If a bit in the bitmap does not correspond to a candidate DMRS port configured by the network device for the terminal device, the bit in the bitmap is set to 0. In other words, if a bit in the bitmap is "0", it indicates that a candidate DMRS port corresponding to the bit is unavailable or no candidate DMRS port corresponds to the bit.

(2) The indication information of the DMRS port set includes the parameter K, and the parameter K is used to indicate that the first K DMRS ports of the candidate DMRS ports that are in a preset DMRS port order and that are configured by the network device for the terminal device belong to the DMRS port set.

In an example, the preset DMRS port order may be determined by the network device and sent to the terminal device by using a broadcast or multicast message, or the like, or may be pre-specified in a protocol. The preset DMRS port order may be an ascending order of DMRS port order numbers. For example, the DMRS configuration information is that the DMRS type is the DMRS type 2 and the DMRS time domain length is the double front-load symbols. In this case, the DMRS port order is "0, 1, 2, 3, 4, 5, 6, 7, 8, 9, 10, 11". In the DMRS port order, each number represents a DMRS port whose port order number is the number. For example, "0" represents "the DMRS port 0". There are similar descriptions in the following, and no additional description is provided. The preset DMRS port order may alternatively be an order including an ascending order of DMRS CDM group order numbers first and then an ascending order of DMRS port order numbers. For example, the DMRS configuration information is that the DMRS type is the DMRS type 1 and the DMRS time domain length is the double front-load symbols. In this case, the DMRS port order is "0, 1, 4, 5, 2, 3, 6, 7". Certainly, the preset DMRS port order may alternatively be an order of alternately mapping DMRS ports in different DMRS CDM groups in ascending order of DMRS CDM group order numbers and in ascending order of DMRS port order numbers. For example, the DMRS configuration information is that the DMRS type is the DMRS type 2 and the DMRS time domain length is the double front-load symbols. In this case, the DMRS port order is "0, 2, 4, 1, 3, 5, 6, 8, 10, 7, 9, 11".

Referring to FIG. 2B, for example, the DMRS configuration information is that the DMRS type is the DMRS type 1 and the DMRS time domain length is the double front-load symbols, the preset DMRS port order is an order including an ascending order of DMRS CDM group order numbers first and then an ascending order of DMRS port order numbers, and K=4. The candidate DMRS ports configured by the network device for the terminal device are sorted as "0, 1, 4, 5, 2, 3, 6, 7" in the preset DMRS port order. The terminal device determines that the first four DMRS ports of the candidate DMRS ports that are in the preset DMRS port order and that are configured by the network device for the terminal device are available and belong to the DMRS port set. In other words, the terminal device determines that the DMRS port 0, the DMRS port 1, the DMRS port 4, and the DMRS port 5 are available DMRS ports, and the DMRS port set is {DMRS port 0, DMRS port 1, DMRS port 4, DMRS port 5}.

(3) The indication information of the DMRS port set includes the parameter M and the parameter N. The parameter M and the parameter N are used to indicate that M DMRS ports, starting from an $N^{th}$ DMRS port, of the candidate DMRS ports that are in the preset DMRS port order and that are configured by the network device for the terminal device belong to the DMRS port set.

Referring to FIG. 3B, for example, the DMRS configuration information is that the DMRS type is the DMRS type 2 and the DMRS time domain length is the double front-load symbols, the preset DMRS port order is an order of alternately mapping DMRS ports in different DMRS CDM groups in ascending order of DMRS CDM group order numbers and in ascending order of DMRS port order numbers, M=4, and N=3. The candidate DMRS ports configured by the network device for the terminal device are sorted as "0, 2, 4, 1, 3, 5, 6, 8, 10, 7, 9, 11" in the preset DMRS port order. The terminal device determines that four DMRS ports, starting from the third DMRS port (the DMRS port 4), of the candidate DMRS ports that are in the preset DMRS port order and that are configured by the network device for the terminal device are available and belong to the DMRS port set. In other words, the terminal device determines that the DMRS port 4, the DMRS port 1, the DMRS port 3, and the DMRS port 5 are available DMRS ports, and the DMRS port set is {DMRS port 4, DMRS port 1, DMRS port 3, DMRS port 5}.

(4) The indication information of the DMRS port set includes the index number, and the index number is used to indicate one of a plurality of preset DMRS port sets corresponding to the candidate DMRS ports configured by the network device for the terminal device.

In a possible implementation, DMRS port set index tables are separately predefined in the network device and the terminal device for different DMRS types and/or DMRS time domain lengths, or the network device configures DMRS port set index tables and sends the DMRS port set index tables to the terminal device by using a broadcast or multicast message, or the like, where the DMRS port set index tables are separately configured for different DMRS types and/or DMRS time domain lengths. In the DMRS port set index tables corresponding to the different DMRS types and/or DMRS time domain lengths, each entry corresponds to one preset DMRS port set, and the entry corresponds to one index number. For example, the DMRS port set index tables are shown as follows:

DMRS port set index table 1 (a DMRS type 1, a DMRS time domain length being a single front-load symbol)

| Index number (Index) | DMRS ports (DMRS ports) |
|---|---|
| 0 | 0 and 1 |
| 1 | 2 and 3 |
| 2 | 0 and 2 |

DMRS port set index table 2 (a DMRS type 1, a DMRS time domain length being double front-load symbols)

| Index | DMRS ports |
|---|---|
| 0 | 0, 1, 4, and 5 |
| 1 | 2, 3, 6, and 7 |
| 2 | 0 and 2 |

DMRS port set index table 3 (a DMRS type 2, a DMRS time domain length being a single front-load symbol)

| Index | DMRS ports |
|---|---|
| 0 | 0 and 1 |
| 1 | 2 and 3 |
| 2 | 4 and 5 |
| 3 | 0, 2, and 4 |

DMRS port set index table 4 (a DMRS type 2, a DMRS time domain length being double front-load symbols)

| Index | DMRS ports |
|---|---|
| 0 | 0, 1, 6, and 7 |
| 1 | 2, 3, 8, and 9 |
| 2 | 4, 5, 10, and 11 |
| 3 | 0, 2, and 4 |

Referring to the DMRS port set index tables 1 to 4, the DMRS port set index table 1 is used to indicate a DMRS port set when the network device configures candidate DMRS ports for the terminal device for a configuration that the DMRS type is the DMRS type 1 and the DMRS time domain length is the single front-load symbol. The DMRS port set index table 2 is used to indicate a DMRS port set when the network device configures candidate DMRS ports for the terminal device for a configuration that the DMRS type is the DMRS type 1 and the DMRS time domain length is the double front-load symbols. The DMRS port set index table 3 is used to indicate a DMRS port set when the network device configures candidate DMRS ports for the terminal device for a configuration that the DMRS type is the DMRS type 2 and the DMRS time domain length is the single front-load symbol. The DMRS port set index table 4 is used to indicate a DMRS port set when the network device configures candidate DMRS ports for the terminal device for a configuration that the DMRS type is the DMRS type 2 and the DMRS time domain length is the double front-load symbols.

Referring to FIG. 2A, for example, the DMRS configuration information is that the DMRS type is the DMRS type 1 and the DMRS time domain length is the double front-load symbols, and the index number is 1. The candidate DMRS ports configured by the network device for the terminal device are the DMRS port 0, the DMRS port 1, the DMRS port 2, and the DMRS port 3. The terminal device determines that the candidate DMRS ports configured by the network device for the terminal correspond to the DMRS port set index table 1, and determines, based on the index number "1", that the DMRS port 0 and the DMRS port 1 are available DMRS ports, and the DMRS port set is {DMRS port 0, DMRS port 1}.

Manner 2: The indication information of the DMRS port set is a quantity of DMRS ports, or is an identifier of one or more DMRS CDM groups.

(1) The indication information of the DMRS port set is the quantity of DMRS ports, and the DMRS port set is a DMRS port set that is in a plurality of preset DMRS port sets corresponding to the candidate DMRS ports configured by the network device for the terminal device and that matches the quantity of DMRS ports.

In a possible implementation, DMRS port sets that match all possible quantities of DMRS ports are separately predefined in the network device and the terminal device for different DMRS types and/or DMRS time domain lengths, or the network device configures DMRS port sets that match all possible quantities of DMRS ports and that are separately configured for different DMRS types and/or DMRS time domain lengths, and sends the DMRS port sets to the terminal device by using a broadcast or multicast message, or the like. In this embodiment of this application, a form of DMRS port quantity matching tables is used as an example to illustrate the DMRS port sets that match all the possible quantities of DMRS ports for the different DMRS types and/or DMRS time domain lengths. In the DMRS port quantity matching tables corresponding to the different DMRS types and/or DMRS time domain lengths, each entry corresponds to one preset DMRS port set, and the entry corresponds to one quantity of DMRS ports. For example, the DMRS port quantity matching tables are shown as follows:

DMRS port quantity matching table 1 (a DMRS type 1, a DMRS time domain length being a single front-load symbol)

| Quantity of DMRS ports | DMRS port |
|---|---|
| 1 | 0 |
| 2 | 0 and 1 |
| 3 | 0, 1, and 2 |
| 4 | 0, 1, 2, and 3 |

DMRS port quantity matching table 2 (a DMRS type 1, a DMRS time domain length being double front-load symbols)

| Quantity of DMRS ports | DMRS port |
|---|---|
| 1 | 0 |
| 2 | 0 and 1 |
| 3 | 0, 1, and 4 |
| 4 | 0, 1, 4, and 5 |
| 5 | 0, 1, 4, 5, and 2 |
| 6 | 0, 1, 4, 5, 2, and 3 |
| 7 | 0, 1, 4, 5, 2, 3, and 6 |
| 8 | 0, 1, 4, 5, 2, 3, 6, and 7 |

| DMRS port quantity matching table 3 (a DMRS type 2, a DMRS time domain length being a single front-load symbol) | |
| --- | --- |
| Quantity of DMRS ports | DMRS port |
| 1 | 0 |
| 2 | 0 and 1 |
| 3 | 0, 1, and 2 |
| 4 | 0, 1, 2, and 3 |
| 5 | 0, 1, 2, 3, and 4 |
| 6 | 0, 1, 2, 3, 4, and 5 |

| DMRS port quantity matching table 4 (a DMRS type 2, a DMRS time domain length being double front-load symbols) | |
| --- | --- |
| Quantity of DMRS ports | DMRS port |
| 1 | 0 |
| 2 | 0 and 1 |
| 3 | 0, 2, and 4 |
| 4 | 1, 3, 5, and 7 |
| 5 | 0, 2, 4, 6, and 8 |
| 6 | 0, 2, 4, 7, 9, and 11 |
| 7 | 0, 1, 2, 3, 4, 5, and 6 |
| 8 | 1, 3, 5, 7, 9, 11, 10, and 8 |
| 9 | 0, 1, 6, 7, 2, 3, 8, 9, and 4 |
| 10 | 2, 3, 4, 5, 6, 7, 8, 9, 10, and 11 |
| 11 | 1, 2, 3, 4, 5, 6, 7, 8, 9, 10, and 11 |
| 12 | 0, 1, 2, 3, 4, 5, 6, 7, 8, 9, 10, and 11 |

Referring to the DMRS port quantity matching tables 1 to 4, the DMRS port quantity matching table 1 is used to indicate a DMRS port set when the network device configures candidate DMRS ports for the terminal device for a configuration that the DMRS type is the DMRS type 1 and the DMRS time domain length is the single front-load symbol. The DMRS port quantity matching table 2 is used to indicate a DMRS port set when the network device configures candidate DMRS ports for the terminal device for a configuration that the DMRS type is the DMRS type 1 and the DMRS time domain length is the double front-load symbols. The DMRS port quantity matching table 3 is used to indicate a DMRS port set when the network device configures candidate DMRS ports for the terminal device for a configuration that the DMRS type is the DMRS type 2 and the DMRS time domain length is the single front-load symbol. The DMRS port quantity matching table 4 is used to indicate a DMRS port set when the network device configures candidate DMRS ports for the terminal device for a configuration that the DMRS type is the DMRS type 2 and the DMRS time domain length is the double front-load symbols.

Referring to FIG. 2B, for example, the DMRS configuration information is that the DMRS type is the DMRS type 1 and the DMRS time domain length is the double front-load symbols, and the quantity of DMRS ports is 5. The network device configures the DMRS port 0, the DMRS port 1, the DMRS port 2, the DMRS port 3, the DMRS port 4, the DMRS port 5, the DMRS port 6, and the DMRS port 7 for the terminal device. The terminal device determines that the candidate DMRS ports configured by the network device for the terminal correspond to the DMRS port quantity matching table 2, and the terminal device determines, based on a quantity, "5", of DMRS ports, that the DMRS port 0, the DMRS port 1, the DMRS port 4, the DMRS port 5, and the DMRS port 2 are available DMRS ports, and the DMRS port set is {DMRS port 0, DMRS port 1, DMRS port 4, DMRS port 5, DMRS port 2}.

(2) The indication information of the DMRS port set is the identifier of the one or more DMRS CDM groups, and the DMRS port set is a DMRS port set including a plurality of DMRS ports that are in the candidate DMRS ports configured by the network device for the terminal device and that correspond to the identifier of the one or more DMRS CDM groups.

In a possible implementation, the identifier of the DMRS CDM group may be an order number of the DMRS CDM group. For example, an identifier of a DMRS CDM group 0 is "0". Referring to FIG. 2A, for example, the DMRS configuration information is that the DMRS type is the DMRS type 1 and the DMRS time domain length is the single front-load symbol, and the indication information of the DMRS port set is the identifier "0" of the DMRS CDM group 0. The candidate DMRS ports configured by the network device for the terminal device are the DMRS port 0, the DMRS port 1, the DMRS port 2, and the DMRS port 3. The terminal device determines, based on the identifier "0" of the DMRS CDM group 0, that the DMRS port 0 and the DMRS port 1 that correspond to the DMRS CDM group 0 are available DMRS ports, and the DMRS port set is {DMRS port 0, DMRS port 1}.

Referring to FIG. 2B, if the DMRS configuration information is that the DMRS type is the DMRS type 1 and the DMRS time domain length is the double front-load symbols, and the indication information of the DMRS port set is still the identifier "0" of the DMRS CDM group 0, the candidate DMRS ports configured by the network device for the terminal device are the DMRS port 0, the DMRS port 1, the DMRS port 2, the DMRS port 3, the DMRS port 4, the DMRS port 5, the DMRS port 6, and the DMRS port 7. The terminal device determines, based on the identifier "0" of the DMRS CDM group 0, that the DMRS port 0, the DMRS port 1, the DMRS port 4, and the DMRS port 5 that correspond to the DMRS CDM group 0 are available DMRS ports, and the DMRS port set is {DMRS port 0, DMRS port 1, DMRS port 4, DMRS port 5}.

In addition, in a possible implementation, the configuration information sent by the network device may include indication information of a plurality of DMRS port sets, to indicate the terminal device to determine different DMRS port sets. Each of the plurality of DMRS port sets corresponds to one PUSCH resource configuration.

Optionally, to reduce interference between DMRS ports and ensure orthogonality between the DMRS ports, when the configuration information sent by the network device includes the indication information of the plurality of DMRS port sets, frequency domain resources occupied by DMRS ports in different DMRS port sets do not overlap, or different DMRS port sets do not have an intersection.

Figure 7:
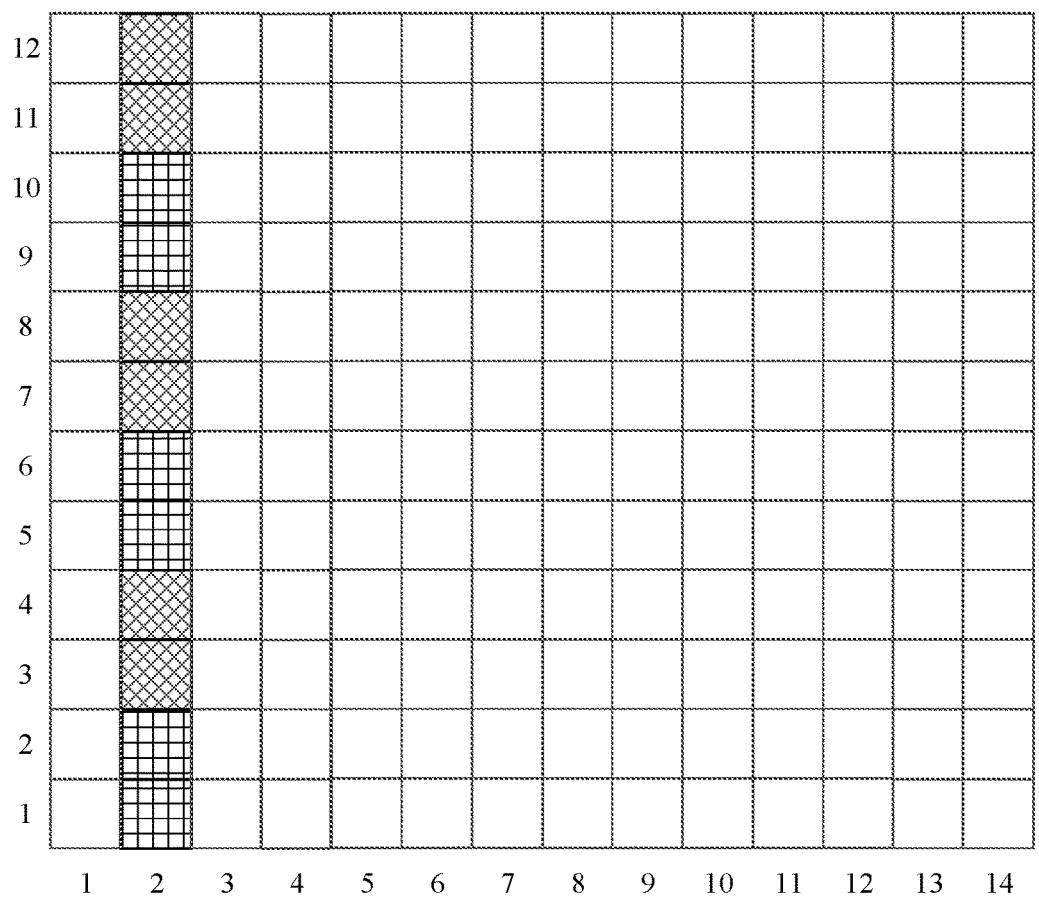
FIG. 7 is a schematic diagram of distribution of a plurality of DMRS port sets according to an embodiment of this application.

For example, the DMRS configuration information is that the DMRS type is the DMRS type 1 and the DMRS time domain length is the single front-load symbol, indication information, of a DMRS port set, included in configuration information A of a DMRS port set A is an identifier "0" of a DMRS CDM group 0, and indication information, of a DMRS port set, included in configuration information B of a DMRS port set B is an identifier "1" of a DMRS CDM group 1. Referring to FIG. 7, the network device configures the DMRS port 0, the DMRS port 1, the DMRS port 2, the DMRS port 3, and the DMRS port 4 for the terminal device. The terminal device determines the DMRS port set A {DMRS port 0, DMRS port 1} based on the identifier "0" of the DMRS CDM group 0, and determines the DMRS port set B {DMRS port 2, DMRS port 3} based on the identifier "1" of the DMRS CDM group 1. The DMRS port set A {DMRS port 0, DMRS port 1} and the DMRS port set B {DMRS port 2, DMRS port 3} do not include a same DMRS port, and occupied frequency domain resources do not overlap.

S602: The terminal device determines a random access preamble.

The configuration information sent by the network device may further include configuration information of the random access preamble, and the configuration information of the random access preamble includes time domain resource configuration information, frequency domain resource configuration information, and/or code domain resource configuration information of the random access preamble. An NR system is used as an example, the time domain resource configuration information and the frequency domain resource configuration information of the random access preamble may be used to determine a periodic physical random access channel (PRACH) time-frequency resource. Each PRACH periodicity includes a plurality of PRACH time-frequency resources, and one or more random access preambles may be determined on each PRACH time-frequency resource based on the code domain resource configuration information of the random access preamble. For example, 64 random access preambles may be determined on each PRACH time-frequency resource. When performing a random access procedure, the terminal device selects a PRACH time-frequency resource from a plurality of PRACH time-frequency resources according to a preset rule, and selects (determines) a random access preamble on the PRACH time-frequency resource.

S603: The terminal device determines one or more target DMRS ports in the DMRS port set based on the random access preamble.

In a possible implementation, if the configuration information includes indication information of only one DMRS port set, after determining the random access preamble, the terminal device may randomly determine one or more target DMRS ports in the DMRS port set as a target DMRS port corresponding to the random access preamble. If the configuration information includes indication information of a plurality of DMRS port sets, after determining the random access preamble, the terminal device may randomly select a target DMRS port set from the plurality of DMRS port sets, and randomly determine one or more target DMRS ports in the target DMRS port set as a target DMRS port corresponding to the random access preamble.

In another possible implementation, when determining, in the DMRS port set, the target DMRS port corresponding to the random access preamble, the terminal device may further determine, in the DMRS port set based on a preset mapping relationship (or according to a mapping rule) between a random access preamble and a DMRS port, one or more target DMRS ports corresponding to the random access preamble.

In an example, the mapping relationship between the random access preamble and the DMRS port may be determined according to a mapping order between the random access preamble and the DMRS port. The mapping order between the random access preamble and the DMRS port includes a mapping order of random access preambles and a mapping order of DMRS ports. The mapping order of the random access preambles and the mapping order of the DMRS ports may be determined by the network device and sent to the terminal device by using a broadcast or multicast message, or the like, or may be pre-specified in a protocol. The mapping order of the DMRS ports may be an order including an ascending order of DMRS CDM group order numbers first and then an ascending order of DMRS port order numbers. For example, the DMRS port set is {DMRS port 0, DMRS port 1, DMRS port 2, DMRS port 3, DMRS port 4, DMRS port 5} and the DMRS configuration information is the DMRS type 2. The DMRS port 0 and the DMRS port 1 are a DMRS CDM group 0, the DMRS port 2 and the DMRS port 3 are a DMRS CDM group 1, and the DMRS port 4 and the DMRS port 5 are a DMRS CDM group 0. A mapping order of DMRS ports in the DMRS port set is determined as "0, 1, 2, 3, 4, 5". The mapping order of the random access preambles may be an order including an ascending order of random access preamble order numbers first, then an ascending order of PRACH frequency domain resource order numbers (numbers), and finally an ascending order of PRACH time domain resource order numbers (numbers). For example, random access preamble associated with the DMRS port set is random access preambles whose order numbers are "0, 1, 2" on a PRACH time-frequency resource 0, and each random access preamble corresponds to one DMRS port. In this case, a random access preamble 0 corresponds to the DMRS port 0. By analogy, if the random access preamble determined by the terminal device is a random access preamble 2, the determined target DMRS port is the DMRS port 2. Similarly, if each random access preamble corresponds to a plurality of DMRS ports, for example, corresponds to two DMRS ports, the random access preamble 0 corresponds to the DMRS port 0 and the DMRS port 1. By analogy, a random access preamble 1 corresponds to the DMRS port 2 and the DMRS port 3, and the random access preamble 2 corresponds to the DMRS port 4 and the DMRS port 5.

In another possible implementation, a plurality of DMRS sequences are configured by using the DMRS configuration information. In this case, the mapping order of the DMRS ports further includes an order of DMRS sequences, where the order of DMRS sequences may be an order including an ascending order of DMRS port order numbers first and then an ascending order of DMRS sequences, or may be an order including an ascending order of DMRS sequences and then an ascending order of DMRS port order numbers. This is not limited in the solutions of this application.

In addition, the configuration information sent by the network device may further include configuration information of a DMRS CDM group without data after random access, to indicate specific DMRS CDM groups corresponding to resources (a time domain resource and a frequency domain resource) that cannot be used to send data. For example, the indication information of the DMRS CDM group without data is a name or an identifier of a DMRS CDM group 1, and then the terminal device determines that (no data) no data can be mapped to resources of the DMRS CDM group 1.

Figure 8:
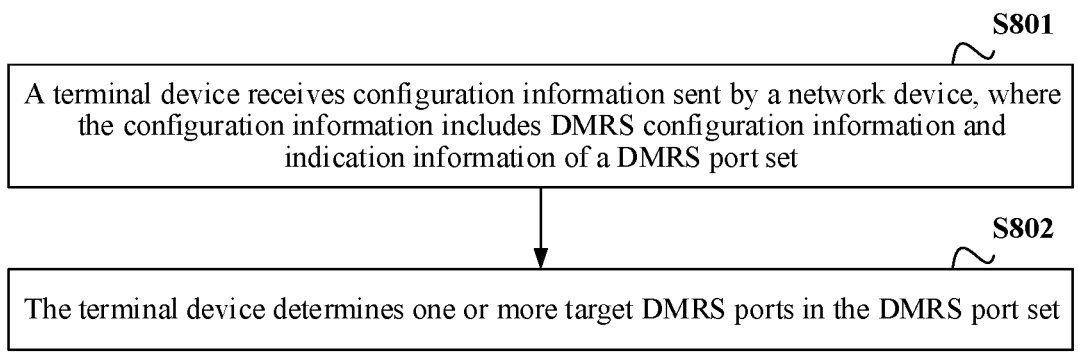
FIG. 8 is a schematic diagram 2 of a DMRS port determining process according to an embodiment of this application.

FIG. 8 is a schematic diagram of another DMRS port determining process according to an embodiment of this application. The process includes the foregoing steps.

S801: A terminal device receives configuration information sent by a network device, where the configuration information includes DMRS configuration information and indication information of a DMRS port set.

In this embodiment of this application, for the DMRS configuration information and the indication information of the DMRS port set, refer to the descriptions of the DMRS port determining process shown in FIG. 6. Repeated parts are not described again.

S802: The terminal device determines one or more target DMRS ports in the DMRS port set.

When using a DMRS port, the terminal device may randomly determine the one or more target DMRS ports in the DMRS port set, or may determine the one or more target DMRS ports in the DMRS port set according to a preset determining rule. For example, when sending uplink data, the terminal device may randomly determine the one or more target DMRS ports in the DMRS port set to send the uplink data, or the terminal device may determine, in a preset mapping order between a synchronization signal block (SSB) and a DMRS port based on an SSB (for example, an SSB corresponding to a determined random access preamble) selected before the terminal device sends the uplink data, the one or more target DMRS ports in the DMRS port set, to send the uplink data.

Embodiment 2

Figure 9:
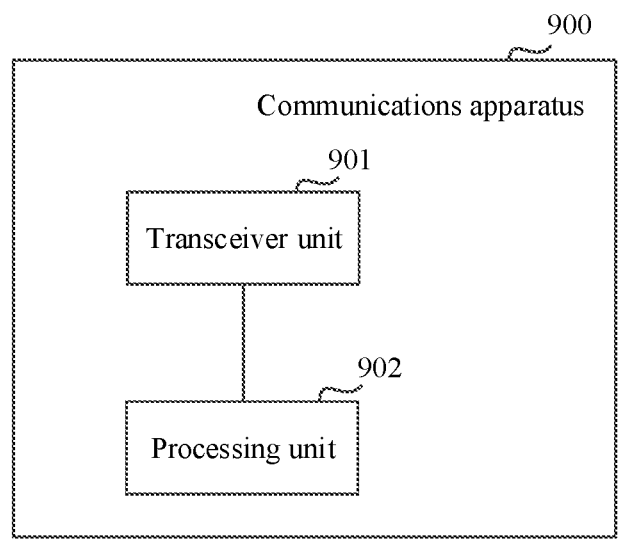
FIG. 9 is a schematic structural diagram of a communications apparatus according to an embodiment of this application.

Based on a same concept as that of the foregoing DMRS port determining methods, as shown in FIG. 9, an embodiment of this application further provides a communications apparatus 900. The communications apparatus 900 may include a transceiver unit 901 and a processing unit 902.

In a possible implementation, the communications apparatus may be configured to perform the steps performed by the terminal device in the DMRS port determining method corresponding to FIG. 6.

Specifically, the transceiver unit 901 is configured to receive configuration information sent by a network device, where the configuration information includes DMRS configuration information and indication information of a DMRS port set, the DMRS configuration information is used to configure a plurality of DMRS ports, and the indication information of the DMRS port set is used to indicate one or more available DMRS ports in the plurality of DMRS ports; and the processing unit 902 is configured to determine a target DMRS port in the DMRS port set.

In a possible design, when determining the target DMRS port in the DMRS port set, the processing unit 902 is specifically configured to: determine a random access preamble; and determine the target DMRS port in the DMRS port set based on the random access preamble.

In a possible design, the indication information of the DMRS port set includes a bitmap, a parameter K, a parameter M and a parameter N, or an index number.

The bitmap is used to indicate distribution of DMRS ports that belong to the DMRS port set and that are in the plurality of DMRS ports.

The parameter K is used to indicate that the first K DMRS ports of the plurality of DMRS ports in the preset DMRS port order belong to the DMRS port set.

The parameter M and the parameter N are used to indicate that M DMRS ports, starting from an $N^{th}$ DMRS port, of the plurality of DMRS ports in the preset DMRS port order belong to the DMRS port set.

The index number is used to indicate one of a plurality of preset DMRS port sets corresponding to the plurality of DMRS ports.

In a possible design, the indication information of the DMRS port set is a quantity of DMRS ports, and the DMRS port set is a DMRS port set that is in a plurality of preset DMRS port sets corresponding to the plurality of DMRS ports and that matches the quantity of DMRS ports.

In a possible design, the indication information of the DMRS port set is an identifier of one or more DMRS code division multiplexing CDM groups, and the DMRS port set is a DMRS port set including a plurality of DMRS ports that correspond to the identifier of the one or more DMRS CDM groups and that are in the plurality of DMRS ports.

In a possible design, if the configuration information includes indication information of a plurality of DMRS port sets, frequency domain resources occupied by DMRS ports in different DMRS port sets do not overlap.

In a possible design, when determining the target DMRS port in the DMRS port set based on the random access preamble, the processing unit 902 is specifically configured to determine, in the DMRS port set in a preset mapping order between a random access preamble and a DMRS port, the target DMRS port corresponding to the random access preamble.

Figure 10:
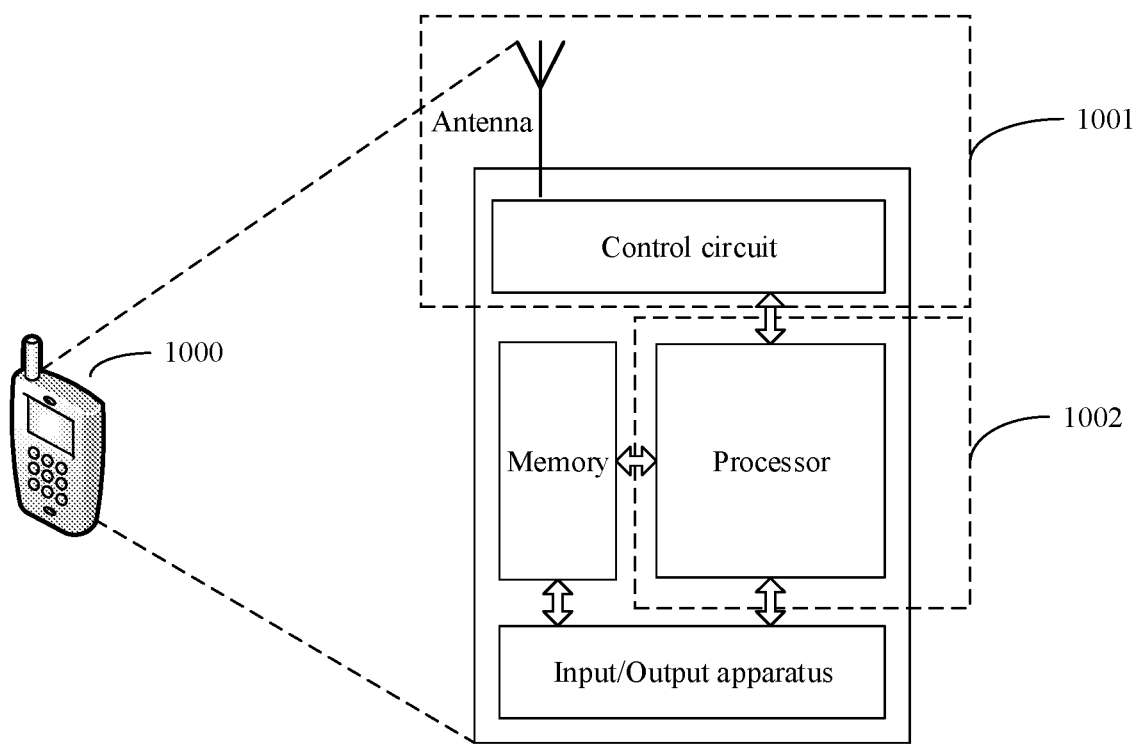
FIG. 10 is a schematic structural diagram of a terminal device according to an embodiment of this application.

Based on a same concept as that of the foregoing DMRS port determining methods, an embodiment of this application further provides a terminal device. As shown in FIG. 10, the terminal device is applicable to the system shown in FIG. 1, and performs a function of the terminal device in the foregoing method embodiments. For ease of description, FIG. 10 shows only main components of the terminal device. As shown in FIG. 10, the terminal device 1000 includes a processor, a memory, a control circuit, an antenna, and an input/output apparatus. The processor is mainly configured to: process a communications protocol and communication data, control the entire terminal device, execute a software program, and process data of the software program. For example, the processor is configured to support the terminal device in performing the actions described in the foregoing method embodiments, for example, sending uplink data based on reference signal indication information. The memory is mainly configured to store a software program and data, for example, store a correspondence that is between indication information and combination information and that is described in the foregoing embodiments. The control circuit is mainly configured to: perform conversion between a baseband signal and a radio frequency signal, and process the radio frequency signal. The control circuit and the antenna may be collectively referred to as a transceiver, which is mainly configured to send and receive a radio frequency signal in an electromagnetic wave form. The input/output apparatus, such as a touchscreen, a display screen, or a keyboard, is mainly configured to: receive data entered by a user and output data to the user.

After the terminal device is powered on, the processor may read the software program in a storage unit, interpret and execute instructions of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal through the antenna in an electromagnetic wave form. When the data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 10 shows only one memory and only one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and/or a central processing unit. The baseband processor is mainly configured to process the communications protocol and the communication data. The central processing unit is mainly configured to: control the entire terminal device, execute the software program, and process the data of the software program. Functions of the baseband processor and the central processing unit may be integrated into the processor in FIG. 10. A person skilled in the art may understand that the baseband processor and the central processing unit each may be an independent processor, and are interconnected by using a technology such as a bus. In another embodiment, the processor in FIG. 10 may also be a baseband processor. A person skilled in the art may understand that the terminal device may include a plurality of baseband processors to adapt to different network standards, and the terminal device may include a plurality of central processing units to enhance a processing capability of the terminal device. Various components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communications data may be embedded into the processor, or may be stored in the storage unit in a form of a software program. The processor executes the software program to implement a baseband processing function.

In this embodiment of this application, the control circuit and the antenna having a transceiver function may be considered as a transceiver unit 1001 of the terminal device 1000. For example, the transceiver unit is configured to support the terminal device in performing a receiving function and a sending function. The processor having a processing function is considered as a processing unit 1002 of the terminal device 1000. As shown in FIG. 10, the terminal device 1000 includes the transceiver unit 1001 and the processing unit 1002. The transceiver unit may also be referred to as a transceiver, a transceiver, a transceiver apparatus, or the like. Optionally, a device configured to implement the receiving function in the transceiver unit 1001 may be considered as a receiving unit. A device that is configured to implement the sending function and that is in the transceiver unit 1001 may be considered as a sending unit. In other words, the transceiver unit 1001 includes the receiving unit and the sending unit. The receiving unit may also be referred to as a receiver, an input port, a receiving circuit, or the like. The sending unit may be referred to as a transmitter, a transmitter, a transmitting circuit, or the like.

The processing unit 1002 may be configured to execute instructions stored in the memory, to control the transceiver unit 1001 to receive a signal and/or send a signal to implement a function of the terminal device in the foregoing method embodiments. In an implementation, it may be considered that a function of the transceiver unit 1001 is implemented by using a transceiver circuit or a transceiver-dedicated chip.

Based on a same concept as that of the foregoing DMRS port determining methods, an embodiment of this application further provides a computer-readable medium. The storage medium stores computer instructions. When the computer instructions are executed by a terminal device, the terminal device is enabled to implement the DMRS port determining method in any one of the foregoing method embodiments.

Based on a same concept as that of the foregoing DMRS port determining methods, an embodiment of this application further provides a computer program product. When the computer instructions are executed by a terminal device, the terminal device is enabled to implement the DMRS port determining method in any one of the foregoing method embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units may be integrated into one unit. The foregoing integrated unit may be implemented in a form of hardware, or may be implemented in a form of a software functional unit.

With descriptions of the foregoing implementations, a person skilled in the art may clearly understand that this application may be implemented by hardware, firmware or a combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a computer. The following provides an example but does not impose a limitation: The computer-readable medium may include a RAM, a ROM, an EEPROM, a CD-ROM, another optical disc storage or disk storage medium, another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk and a disc used in this application include a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A demodulation reference signal (DMRS) port determining method, comprising:
   receiving configuration information sent by a network device, wherein the configuration information comprises DMRS configuration information and indication information of a DMRS port set, the DMRS configuration information is used to configure a plurality of DMRS ports, and the indication information of the DMRS port set is used to indicate one or more available DMRS ports in the plurality of DMRS ports; and
   determining a target DMRS port in the DMRS port set;
   wherein the indication information of the DMRS port set comprises a parameter K, and the parameter K is used to indicate that a first K DMRS ports of the plurality of DMRS ports in a preset DMRS port order belong to the DMRS port set; or
   wherein the indication information of the DMRS port set is an identifier of one or more DMRS code division multiplexing (CDM) groups, and the DMRS port set is a DMRS port set consisting of a plurality of DMRS ports that correspond to the identifier of the one or more DMRS CDM groups and that are in the plurality of DMRS ports.

2. The method according to claim 1, wherein the determining the target DMRS port in the DMRS port set comprises:
   determining a random access preamble; and
   determining the target DMRS port in the DMRS port set based on the random access preamble.

3. The method according to claim 1, wherein the indication information of the DMRS port set comprises a bitmap, a parameter M and a parameter N, or an index number, wherein:
   the bitmap is used to indicate distribution of DMRS ports that belong to the DMRS port set and that are in the plurality of DMRS ports;
   the parameter M and the parameter N are used to indicate that M DMRS ports, starting from an $N^{th}$ DMRS port, of the plurality of DMRS ports in a preset DMRS port order belong to the DMRS port set; and
   the index number is used to indicate one of a plurality of preset DMRS port sets corresponding to the plurality of DMRS ports.

4. The method according to claim 1, wherein the indication information of the DMRS port set is used to indicate that the first K DMRS ports of the plurality of DMRS ports in the preset DMRS port order belong to the DMRS port set.

5. The method according to claim 1, wherein the indication information of the DMRS port set is a quantity of DMRS ports, and the DMRS port set is a DMRS port set that is in a plurality of preset DMRS port sets corresponding to the plurality of DMRS ports.

6. The method according to claim 1, wherein if the configuration information comprises indication information of a plurality of DMRS port sets, frequency domain resources occupied by DMRS ports in different DMRS port sets do not overlap.

7. The method according to claim 2, wherein the determining the target DMRS port in the DMRS port set based on the random access preamble comprises:
   determining, in the DMRS port set in a preset mapping order between a random access preamble and a DMRS port, the target DMRS port corresponding to the random access preamble.

8. A communications apparatus, wherein the apparatus comprises:
   a transceiver, configured to receive configuration information sent by a network device, wherein the configuration information comprises demodulation reference signal (DMRS) configuration information and indication information of a DMRS port set, the DMRS configuration information is used to configure a plurality of DMRS ports, and the indication information of the DMRS port set is used to indicate one or more available DMRS ports in the plurality of DMRS ports; and a processor, configured to determine a target DMRS port in the DMRS port set;

wherein the indication information of the DMRS port set comprises a parameter K, and the parameter K is used to indicate that a first K DMRS ports of the plurality of DMRS ports in a preset DMRS port order belong to the DMRS port set; or wherein the indication information of the DMRS port set is an identifier of one or more DMRS code division multiplexing (CDM) groups, and the DMRS port set is a DMRS port set consisting of a plurality of DMRS ports that correspond to the identifier of the one or more DMRS CDM groups and that are in the plurality of DMRS ports.

9. The communications apparatus according to claim 8, wherein when determining the target DMRS port in the DMRS port set, the processor is specifically configured to determine a random access preamble, and determine the target DMRS port in the DMRS port set based on the random access preamble.

10. The communications apparatus according to claim 8, wherein the indication information of the DMRS port set comprises a bitmap, a parameter M and a parameter N, or an index number, wherein:

the bitmap is used to indicate distribution of DMRS ports that belong to the DMRS port set and that are in the plurality of DMRS ports;

the parameter M and the parameter N are used to indicate that M DMRS ports, starting from an $N^{th}$ DMRS port, of the plurality of DMRS ports in a preset DMRS port order belong to the DMRS port set; and the index number is used to indicate one of a plurality of preset DMRS port sets corresponding to the plurality of DMRS ports.

11. The communications apparatus according to claim 8, wherein the indication information of the DMRS port set is used to indicate that the first K DMRS ports of the plurality of DMRS ports in the preset DMRS port order belong to the DMRS port set.

12. The communications apparatus according to claim 8, wherein the indication information of the DMRS port set is a quantity of DMRS ports, and the DMRS port set is a DMRS port set that is in a plurality of preset DMRS port sets corresponding to the plurality of DMRS ports.

13. The communications apparatus according to claim 8, wherein if the configuration information comprises indication information of a plurality of DMRS port sets, frequency domain resources occupied by DMRS ports in different DMRS port sets do not overlap.

14. The communications apparatus according to claim 9, wherein when determining the target DMRS port in the DMRS port set based on the random access preamble, the processor is specifically configured to determine, in the DMRS port set in a preset mapping order between a random access preamble and a DMRS port, the target DMRS port corresponding to the random access preamble.

15. A non-transitory computer-readable storage medium, wherein the storage medium stores computer instructions, and when the computer instructions are executed by a communications apparatus, the communications apparatus performs a method comprising:

receiving configuration information sent by a network device, wherein the configuration information comprises demodulation reference signal (DMRS) configuration information and indication information of a DMRS port set, the DMRS configuration information is used to configure a plurality of DMRS ports, and the indication information of the DMRS port set is used to indicate one or more available DMRS ports in the plurality of DMRS ports; and determining a target DMRS port in the DMRS port set;

wherein the indication information of the DMRS port set comprises a parameter K, and the parameter K is used to indicate that a first K DMRS ports of the plurality of DMRS ports in a preset DMRS port order belong to the DMRS port set; or wherein the indication information of the DMRS port set is an identifier of one or more DMRS code division multiplexing (CDM) groups, and the DMRS port set is a DMRS port set consisting of a plurality of DMRS ports that correspond to the identifier of the one or more DMRS CDM groups and that are in the plurality of DMRS ports.

* * * * *